March 12, 1963
A. W. PETRI
3,080,646
SPOOL ASSEMBLING MACHINE
Filed July 3, 1959
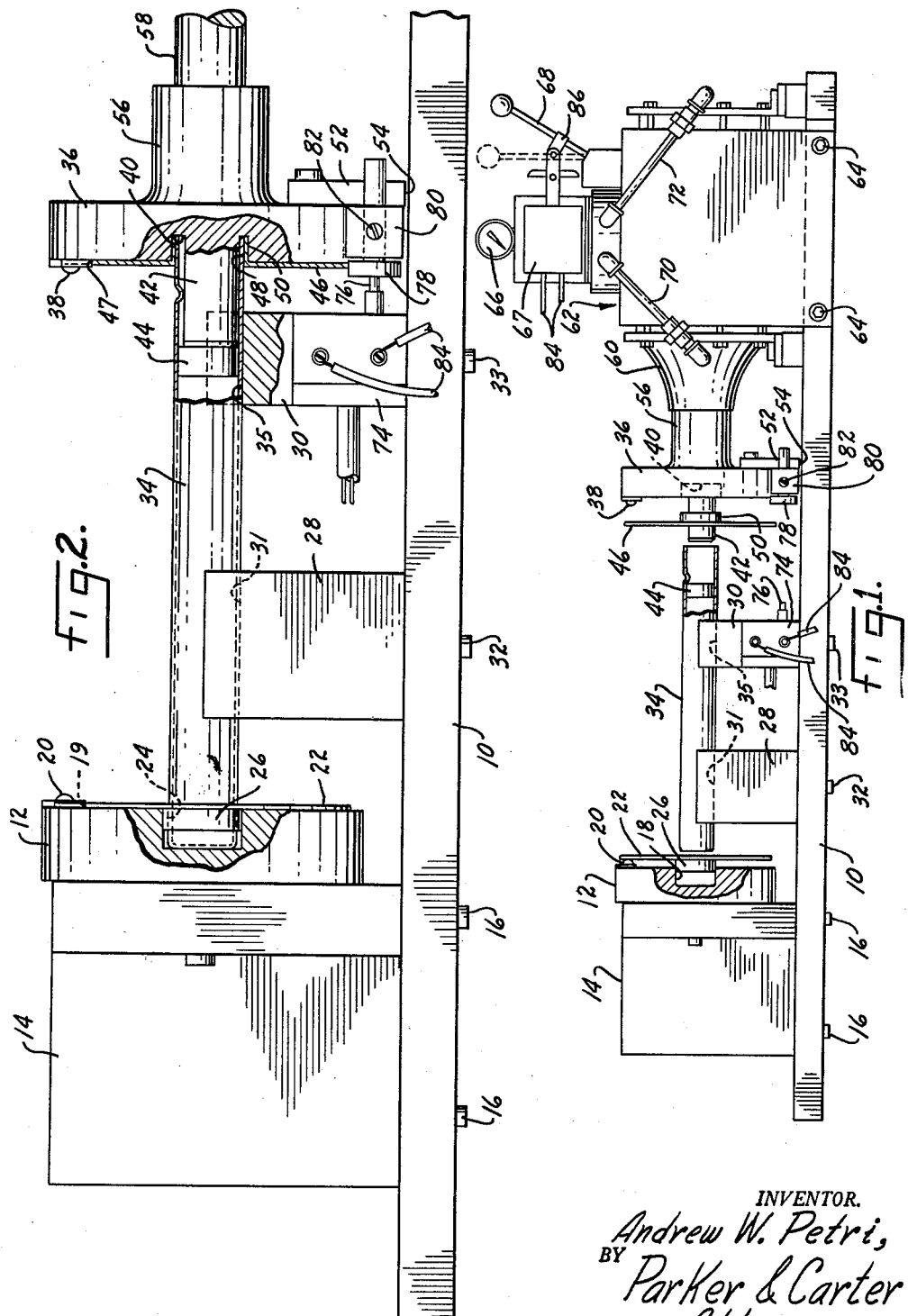
INVENTOR.
Andrew W. Petri,
BY Parker & Carter
Attorneys.

United States Patent Office 3,080,646
Patented Mar. 12, 1963

3,080,646
SPOOL ASSEMBLING MACHINE
Andrew W. Petri, Morton Grove, Ill., assignor to Wm. W. Nugent & Co. (Inc.), Skokie, Ill., a corporation of Illinois
Filed July 3, 1959, Ser. No. 824,865
1 Claim. (Cl. 29—252)

This invention relates to a method of and machine for assembling spools and has for one purpose to provide a machine for assembling a spool utilized in a filter.

Another purpose is to provide a spool assembly unit operated by air pressure that can quickly assemble spools of varying size consisting of a tubular member and a pair of spaced end plates.

Another purpose is to provide a spool assembly machine which while pressing a pair of end plates on a tubular member, simultaneously positions a valve seat in the tubular member.

Other purposes will appear in the ensuing specification, drawings and claim.

The invention is illustrated more or less diagrammatically in the accompanying drawings, wherein—

FIGURE 1 is a partly sectioned side elevation of the assembly machine with the spool parts positioned for assembly;

FIGURE 2 is a detail enlarged view in part section of the assembly machine showing a spool in assembled form.

Like parts are indicated by like characters throughout the specification and drawings.

Referring to the drawings, 10 indicates a suitable base for the assembly machine. A head block 12 is mounted on a head piece 14 which is bolted to the base at 16. A bore hole 18 centered in the head block 12 is adapted to receive one end of a tubular member hereinafter described. At the top of the head block 12 is an indexing piece 20.

A spool head end plate 22, apertured at 24, is flanged at 26 to penetrate the borehole 18. An index recess 19 in the periphery of the end plate 22 is adapted to be engaged by the index piece 20.

A head saddle block 28 spaced from the end block 12 is bolted at 32 to the base 10 and is grooved at 31 to center a tubular member 34 in axial alignment with the aperture in the plate 22 and with the hole 18. A tail saddle block 30, spaced from the head saddle block 28 is bolted to the base 10 at 33, is grooved at 35 and provides additional means to support and align the tubular member 34.

Spaced from the tail saddle member 30 is a tail block 36, having an indexing member 38 and annularly recessed at 40. A cylindrical projection 42 is centered in the recess 40 and is of slightly smaller diameter than the inside diameter of the tubular member 34.

When a spool is to be assembled as in FIGURE 2, the projection 42 penetrates the tubular member 34 and engages a valve seat 44 which may be previously inserted in the tube 34. As shown in FIGURE 1, a tail end plate 46 centrally aperture at 48 and flanged at 50 overrides the projection 42. The sleeve 50 is received in the cavity 40. The end plate 46 has an index recess 47 similar to the indexing recess 19 of the head end plate.

At the bottom of the tail block 36 is a guide member 52 having a flat lower surface 54 engaging the base 10 to inhibit rotational movement of the block as it moves toward the saddle members and the head block. There is working clearance between the lower surface 54 and the base 10.

Projecting from the back of the tail block 36 is a sleeve 56 and a piston rod 58, the latter penetrates the housing 60 which is formed on one side of an air cylinder indicated generally at 62, the air cylinder 62 is bolted on the base 10 at 64.

The tail saddle member 30 carries a micro-switch 74. An actuating plunger 76 projects toward the tail block and responds to mechanical pressure to close the micro-switch and complete an electrical circuit hereinafter described. An adjustable stop 78 is secured to a block 80 attached to guide member 52 and may axially be adjusted and locked in place by a set screw 82.

When the tail block 36 is moved by the piston 58 toward the head block the plates will be forced into place on the tube member 34, and the stop 78 will contact micro-switch plunger 76 when the piston has moved the proper distance to correctly assemble the tube and plates.

When stop 78 contacts the plunger, it closes the micro-switch and completes an electrical circuit from a suitable power source connected to the micro-switch through wires 84 to a solenoid 67.

On the air cylinder 62 is an air pressure control including an air pressure dial 66, a solenoid 67 and an actuating arm 68. The arm 68 is shown in off position in full lines and in air supply position in dotted lines in FIGURE 2 and is connected through linkage 86 to the solenoid. After the piston 58 has traveled the proper distance to correctly align the spool members, the circuit to solenoid 67 is closed and the solenoid moves the actuating arm 68 to the position shown in full lines to shut off the air supply.

A pair of air pressure conduits 70, 72 are each connected to the pressure regulator which receives air from an air supply not shown. The conduit 70 is connected to the piston housing 60 and introduces air under pressure to move the piston back to starting position; conduit 72 carries air to the opposite side of the air cylinder to force the piston into the end position of FIGURE 2. Movement of the actuating arm 68 into the operating position permits air under pressure to flow through conduit 72 whereas automatic movement of the arm 68 back to its original position permits air under pressure to flow into conduit 70.

The use, operation and function of the invention are as follows:

When operating or using a machine for assembling spools such as described herein, the valve seat is first inserted in the tubular member which is then placed upon the two saddle members. Next the two end plates are socketed in the head and tail blocks, the flanges being received in the cavities as shown with the index recesses engaging the index pieces. The end plate 46 is not necessarily received within the cylindrical cavity in the tail block but it may be. After all of the members have been suitably positioned so that they are all axially aligned, the actuating handle is moved to the operating position which permits air under pressure to the cylinder to move the piston and the tail block into the position shown in FIGURE 2. As the members come together the projection from the second end block simultaneously positions and guides the valve seat within the tubular member. The assembled spool is shown in FIGURE 2.

When the piston has travelled the proper distance the circuit to solenoid 67 is closed through micro-switch 74. This automatically moves the actuating arm to the end position which in turn causes the piston to move away from the spool and release it. This completes the operation cycle of the machine and the spool may then be taken off and new elements placed on the machine. I have removed any chance of human error in the alignment and positioning of the parts by the use of the solenoid and associated electrical circuit which automatically provides for proper piston travel to correctly position the spool parts.

The invention is particularly applicable for assembling spools of various lengths as the tail block may be positioned at various points along the base to coincide with the particular length of the tubular member used in a spool. The set screw 82 provides for proper adjustment of stop 78 which determines the distance the piston will travel. Also of importance in the invention is the provision of the projection for guiding and positioning the valve seat within the tubular member. This permits the complete assembly of a spool in one operation.

Although the invention has been generally described as being applicable to assemble a spool such as used in a liquid filter the invention is obviously not limited thereto. The invention would be equally suitable for assembling any type of spool in which a pair of spaced end plates are to be positioned in a tubular member.

The invention is not limited to the specific details of construction described above and illustrated in the accompanying drawings, but covers all modifications coming within the scope of the following claim.

I claim:

In a machine for assembling spools or the like, a base, a head block fixed thereon, a tail block and means for moving it toward and away from the head block, a saddle block mounted on the base between the head and tail blocks, the head block having a cylindrical bore generally in alignment with the top of the saddle block, an annular recess in the tail block concentric with the bore in the head block, said recess having an outer wall and an inner wall concentric with the outer wall, a projection extending outwardly from the tail block towards the head block, said projection having a diameter smaller than the diameter of the annular recess outer wall and generally equal to the diameter of said inner wall such that said porjection is a continuation of said inner wall, the means for moving the tail block including an air cylinder having a reciprocal piston, said tail block being carried by said piston, means for initiating movement of said piston and tail block toward said head block, a switch and an actuating member therefor, one on the saddle block and the other on the tail block, the switch and actuating member being aligned with each other such that they contact upon movement of the tail block and projection toward the head block, said actuating member being adjustable, and a solenoid actuated by the switch for stopping movement of the piston and tail block toward the head block.

References Cited in the file of this patent

UNITED STATES PATENTS

| | | |
|---|---|---|
| 950,573 | Morah | Mar. 1, 1910 |
| 1,137,643 | Longaker | Apr. 27, 1915 |
| 1,451,381 | Tunnell | Apr. 10, 1923 |
| 1,663,499 | Hathaway | Mar. 20, 1928 |
| 1,677,860 | Ferris | July 17, 1928 |
| 1,856,768 | Johnson et al. | May 3, 1932 |
| 1,976,155 | Bebie et al. | Oct. 9, 1934 |
| 2,331,325 | Jansen | Oct. 12, 1943 |
| 2,367,753 | Buck | Jan. 23, 1945 |
| 2,390,170 | Poole | Dec. 4, 1945 |
| 2,655,718 | Haegele | Oct. 20, 1953 |
| 2,660,780 | Beck | Dec. 1, 1953 |
| 2,916,812 | Milo | Dec. 15, 1959 |

FOREIGN PATENTS

| | | |
|---|---|---|
| 491,260 | Canada | Mar. 17, 1953 |